(12) United States Patent
Sawada et al.

(10) Patent No.: US 7,578,550 B2
(45) Date of Patent: Aug. 25, 2009

(54) SUNROOF DEVICE (75) Inventors: Kazuki Sawada, Handa (JP); Toshio Iwata, Anjo (JP); Katsuyoshi Iwashita, Chiryu (JP); Kiyozumi Fukami, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 520 days.

(21) Appl. No.: 10/579,501

(22) PCT Filed: Nov. 30, 2004

(86) PCT No.: PCT/JP2004/017815

§ 371 (c)(1),
(2), (4) Date: May 16, 2006

(87) PCT Pub. No.: WO2005/053981

PCT Pub. Date: Jun. 16, 2005

(65) Prior Publication Data

US 2008/0191519 A1    Aug. 14, 2008

(30) Foreign Application Priority Data

Dec. 3, 2003   (JP) .............................. 2003-404982

(51) Int. Cl.
*B60J 7/185*   (2006.01)
*B60J 7/043*   (2006.01)

(52) U.S. Cl. ................................. 296/224; 296/216.02
(58) Field of Classification Search ............ 296/216.02, 296/224
See application file for complete search history.

(56) References Cited

U.S. PATENT DOCUMENTS

| 4,684,169 | A | * | 8/1987 | Igel et al. ...................... 296/221 |
| 4,725,092 | A | * | 2/1988 | Reintges et al. .............. 296/221 |
| 6,158,803 | A | | 12/2000 | Reihl et al. |
| 7,125,070 | B2 | * | 10/2006 | Sawada et al. ......... 296/216.03 |

FOREIGN PATENT DOCUMENTS

| JP | 03-109123 | 5/1991 |
| JP | 07-032888 | 2/1995 |
| JP | 09-277836 | 10/1997 |
| JP | 2002-052932 | 2/2002 |
| JP | 2003-231417 | 8/2003 |

OTHER PUBLICATIONS

International Preliminary Report on Patentability (in English), issued in PCT/JP2004/017815 on Aug. 31, 2006, The International Bureau of WIPO, Geneva, CH.

* cited by examiner

*Primary Examiner*—Dennis H Pedder
(74) *Attorney, Agent, or Firm*—Buchanan Ingersoll & Rooney PC (57)    ABSTRACT A sunroof device having a guide shoe provided with a first engagement portion and a check block with second and third engagement portions for inhibiting movement thereof.

7 Claims, 11 Drawing Sheets

SUNROOF DEVICE

FIELD OF THE INVENTION

The present invention relates to a sunroof device mounted on a vehicle.

BACKGROUND OF THE INVENTION

Conventionally, various types of sunroof devices have been proposed, and a sunroof device, for example, described in Patent Document 1 has been known.

The sunroof device described in Patent Document 1 uses a construction in which a guide rail is separately arranged on the outside of a vehicle to open a movable panel more widely, and its complicated construction inevitably increases the number of parts and the costs. Also, in this sunroof device, the up-and-down movement and slide of the front part of a functional bracket (22) and the up-and-down movement and slide of the rear part thereof are accomplished at the same time, so that very subtle operation control is required.

On the other hand, in order to avoid such subtle operation control, a shift of operation timing of the front part and rear part of functional bracket has been proposed. In this case, a changeover needs to be performed in which, during the operation of one of the front part and rear part of functional bracket, the operation of the other is inhibited, and after the operation of one has been finished, the operation of the other is permitted. In the case where such a changeover is accomplished, for example, by utilizing the elastic force of an urging member (a spring etc.), an unusual sound is sometimes produced by a sudden changeover.

[Patent Document 1]: Japanese Laid-Open Patent Publication No. 2002-52932

SUMMARY OF THE INVENTION

An objective of the present invention is to provide a sunroof device capable of restraining the production of an unusual sound at the time of changeover between a state in which the movement of a functional bracket is inhibited in a state in which the rise in the rear part of the functional bracket is unfinished and a state in which the movement of the functional bracket is allowed in a state in which the rise in the rear part of the functional bracket is finished.

In one aspect of the present invention, there is provided a sunroof device including: a functional bracket which supports a movable panel provided in a roof opening portion of a vehicle; a regulation section provided on a guide rail; a shoe which has a first engagement portion and moves in the front and rear direction of the vehicle along the guide rail; and a check block having a second engagement portion and a third engagement portion. This sunroof device is characterized by being configured so that the configuration is such that the functional bracket is connectingly supported pivotally on the check block, and the functional bracket and the check block are raised or lowered integrally; the check block is pressedly stopped by the first engagement portion so that the second engagement portion is locked to the regulation section in a state in which the rise in the rear part of the functional bracket is unfinished to inhibit the movement of the check block along with the movement of the shoe; and the third engagement portion is locked to the first engagement portion in a state in which the rise in the rear part of the functional bracket is finished to release the locking state of the second engagement portion and the regulation section along with the movement of the shoe, by which the shoe and the check block are moved integrally.

(Operation)

According to one aspect of the present invention, in the state in which the rise in the rear part of the functional bracket is unfinished, the check block is pressedly stopped by the first engagement portion so that the second engagement portion is locked to the regulation section, by which the movement along with movement of the shoe is inhibited. Thereby, the movement of the functional bracket supported on the check block is inhibited in the state in which the rise in the rear part of the functional bracket is unfinished.

On the other hand, in the state in which the rise in the rear part of the functional bracket is finished, the third engagement portion is locked to the first engagement portion to release the locking state of the second engagement portion and the regulation section along with the movement of the shoe, by which the check block is moved integrally with the shoe. Thereby, the functional bracket supported on the check block is also moved (slid) integrally in the front and rear direction of the vehicle. Thus, the locking state of the second engagement portion and the regulation section is released along with the movement of the shoe, by which a changeover from the state in which the movement of the functional bracket is inhibited to the state in which it is allowed is accomplished. Alternatively, the second engagement portion unlocked from the regulation section is set in a state of being locked to the regulation section along with the movement of the shoe, by which a changeover from the state in which the movement of the functional bracket is allowed to the state in which it is inhibited is accomplished. Therefore, an unusual sound at the time of changeover can be restrained as compared with the case where such a changeover is accomplished suddenly, for example, by utilizing the elastic force of an urging member (a spring etc.).

The check block may be extendingly provided on the rear side of the turning center of the functional bracket. Also, the second engagement portion and the third engagement portion may be arranged vertically, and may be provided in the rear-side end portion of the check block. In these configurations, the restraint of travel amount of the functional bracket is avoided, for example, unlike the case where the check block is arranged on the front side of the turning center of the functional bracket.

The regulation section may be a regulation groove formed so that the second engagement portion can be guided to a guide block fixed to the guide rail. In this configuration, like one mode of the present invention, an unusual sound at the time of changeover is restrained as compared with the case where a changeover from the state in which the movement of the functional bracket is inhibited to the state in which it is allowed and a changeover from the state in which the movement of the functional bracket is allowed to the state in which it is inhibited are accomplished suddenly by utilizing the elastic force of an urging member (a spring etc.).

The check block may have a holding portion for restraining looseness in the state in which the rise in the rear part of the functional bracket is unfinished. In this configuration, by the holding portion of the check block, looseness in the state in which the rise in the rear part of the functional bracket is unfinished is restrained without the addition of separate parts.

The configuration may be such that the sunroof device includes a guide groove provided in the guide rail; and the functional bracket has an engagement portion provided with a center axis coinciding with the turning center with respect to the check block which is guided to the guide groove to move the front part of the functional bracket up and down in the integral movement via the check block caused by the movement of the shoe. In this configuration, since the front part of the functional bracket can also be moved up and down, for example, the degree of freedom is improved in designing the seal structure between the movable panel supported on the functional bracket and the roof opening portion. Also, since the engagement portion has the center axis coinciding with the turning center of the functional bracket to be guided to the guide groove, the turning center rises or lowers directly along the guide groove, so that a loss of driving force is reduced as compared with, for example, the case where another member is interposed to raise or lower the turning center of the functional bracket. Further, since the check block is provided with a function as a link for moving the front part of the functional bracket in the vertical direction in addition to a function of inhibiting the movement of the functional bracket, the number of parts is reduced as compared with, for example, the case where members having these functions are provided individually. Thereby, the cross-sectional area of the guide rail is reduced, and hence the space occupied by the guide rail is saved. Since the cross-sectional area of the guide rail is reduced, the opening area of the roof opening portion can be increased accordingly.

The outer wall surface of the engagement portion may have a deflection structure which comes into elastic contact with the inner wall surface of the guide groove in the state in which the rise in the rear part of the functional bracket is unfinished. In this configuration, since the deflection structure provided on the outer wall surface of the engagement portion comes into elastic contact with the inner wall surface of the guide groove, looseness in the state in which the rise in the rear part of the functional bracket is unfinished is restrained without the addition of separate parts.

DESCRIPTION OF THE PREFERRED EMBODIMENTS

One embodiment according to the present invention will now be described with reference to the accompanying drawings.

Figure 11:
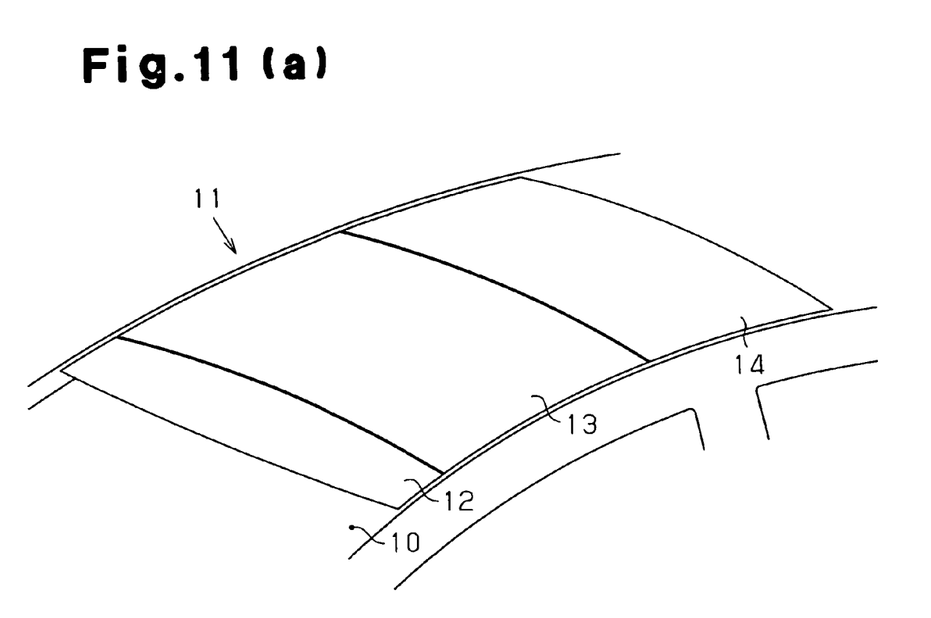
FIG. 11(a) is a perspective view showing a state in which a movable panel is closed.
FIG. 11(b) is a perspective view showing a state in which a movable panel is opened (fully opened).

FIGS. 11(a) and 11(b) are schematic views of a sunroof device 11 mounted on a roof 10 of a vehicle such as an automobile, viewed from the slantwise upside. FIG. 11(a) shows a state in which the sunroof device 11 is closed, and FIG. 11(b) shows a state in which the sunroof device 11 is fully opened.

As shown in FIGS. 11(a) and 11(b), the roof 10 is provided with a roof opening portion 10a. In this roof opening portion 10a, a deflector panel 12, a movable panel 13, and a fixed panel 14 are arranged in that order from the vehicle front side to the vehicle rear side. These deflector panel 12, movable panel 13, and fixed panel 14 each are formed by, for example, a glass pane capable of allowing light to pass through, and are mounted on the roof 10 so as to close the roof opening portion 10a from the upside in the state in which the sunroof device 11 is closed.

The deflector panel 12 is attached so that the rear part thereof moves upward with the front part thereof being the turning center, namely, so as to be capable of performing what is called a tilt-up operation, so that the deflector panel 12 performs a tilt-up operation in association with the opening operation of the movable panel 13. The movable panel 13 is attached so as to be capable of performing a tilt-up operation and a slide operation in the front and rear direction via a mechanism section, described later. Further, the movable panel 13 employs what is called an outer slide device in which slide operation is performed in a tilt-up state. The fixed panel 14 is fixed at that position in a state in which the roof opening portion 10a is closed.

Figure 1A:
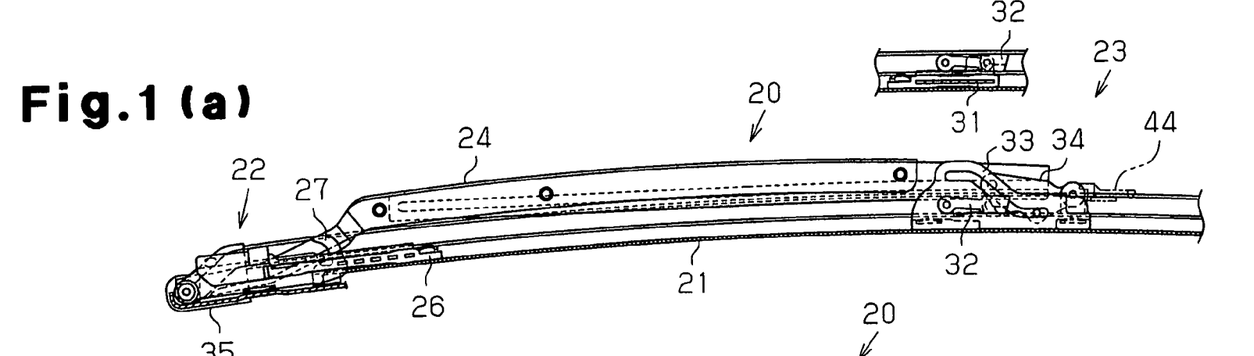
FIGS. 1(a), 1(b) and 1(c) are side views showing operation modes of a mechanism section in accordance with one embodiment of the present invention.
Figures 1B, 1C:
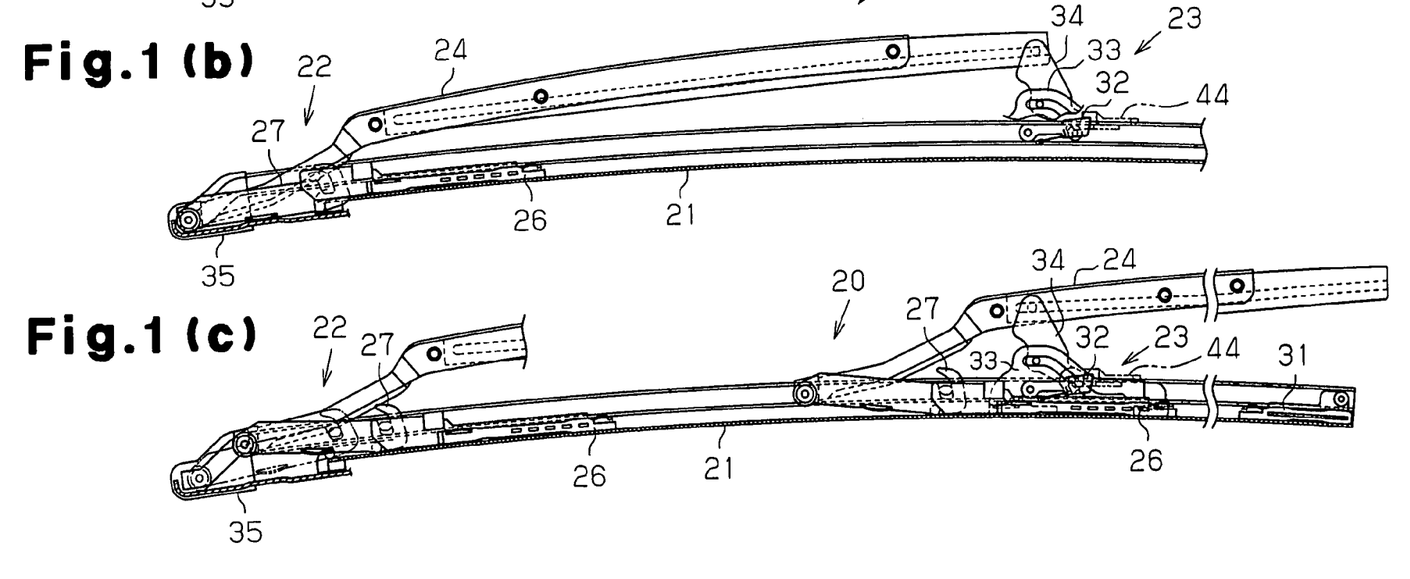

Next, the mechanism section of the sunroof device 11 for opening and closing the movable panel 13 is explained. FIGS. 1(a), 1(b) and 1(c) are side views showing a mechanism section 20 for opening and closing the movable panel 13. The mechanism section 20 is provided in a pair on both sides of the roof opening portion 10a corresponding to both sides in the width direction (right and left direction) of the vehicle. The mechanism sections 20 have the same construction except that they are symmetrical with respect to the center axis of the vehicle extending in the front and rear direction of the vehicle. FIGS. 1(a), 1(b) and 1(c) each are a side view in which the mechanism section 20 disposed on one side (right-hand side when one faces the vehicle front) of the roof opening portion 10a viewed from the inside of vehicle. Therefore, the left-hand side of FIGS. 1(a), 1(b) and 1(c) corresponds to the front side, and the right-hand side thereof corresponds to the rear side. FIGS. 1(a), 1(b) and 1(c) stepwise show the operation modes of the mechanism section 20 at the time when the movable panel 13 is opened. Specifically, FIG. 1(a) shows a state in which the movable panel 13 is closed, FIG. 1(b) shows a state in which the movable panel 13 is in the tilt-up state, and FIG. 1(c) shows a state in which the movable panel 13 is fully opened.

As shown in FIGS. 1(a), 1(b) and 1(c), the mechanism section 20 includes a guide rail 21 which extends in the front and rear direction of vehicle and is arranged on the passenger compartment side of the roof 10, a front mechanism section 22, a rear mechanism section 23, and a functional bracket 24. The operation of the front part of the functional bracket 24 and the operation of the rear part thereof are regulated by the front mechanism section 22 and the rear mechanism section 23. The movable panel 13 is attached to the functional bracket 24 (the connection mode between the movable panel 13 and the functional bracket 24 is not shown in the figure).

Figure 2:
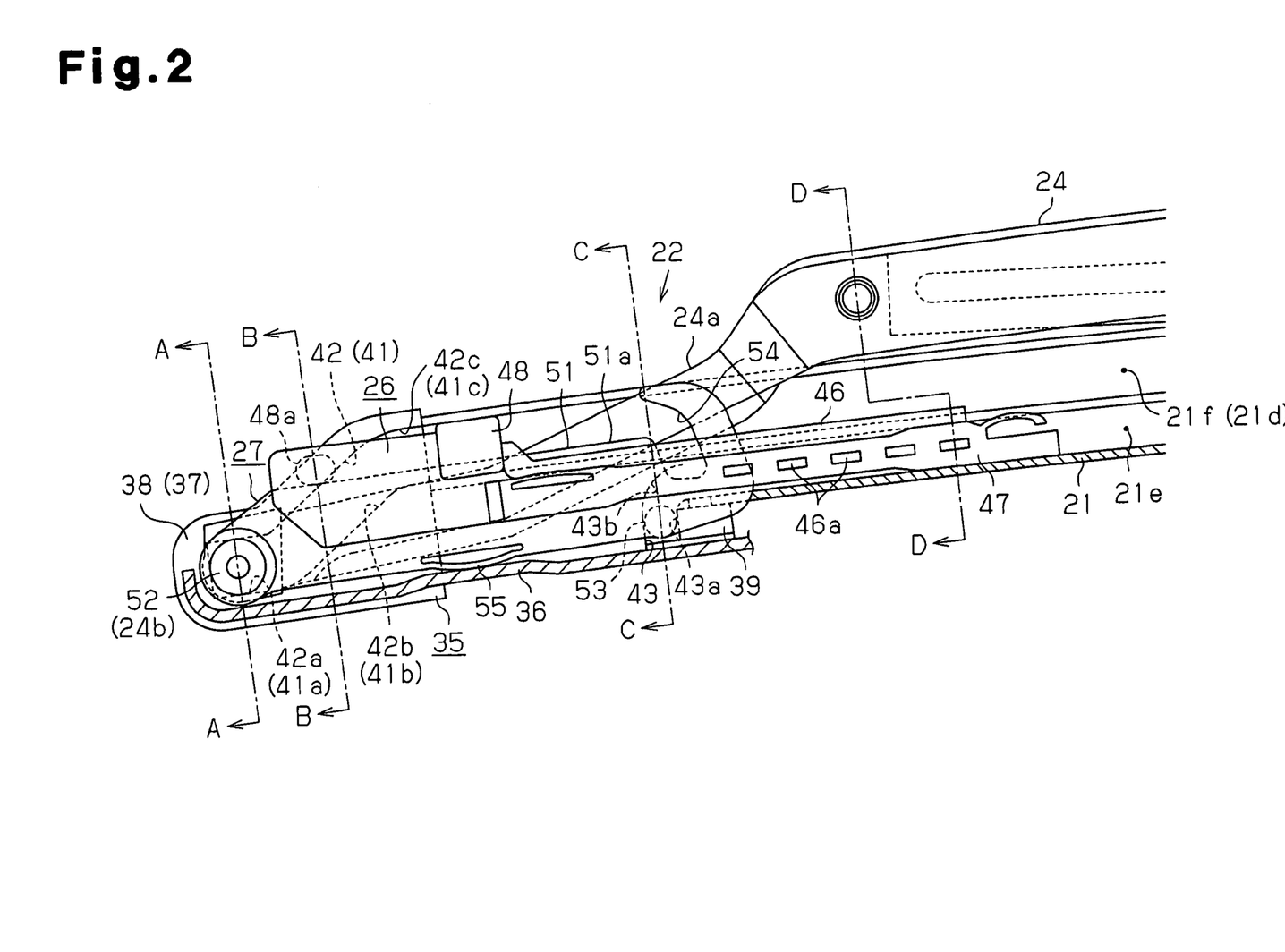
FIG. 2 is an enlarged view showing the front side of FIG. 1(a)
Figure 3:
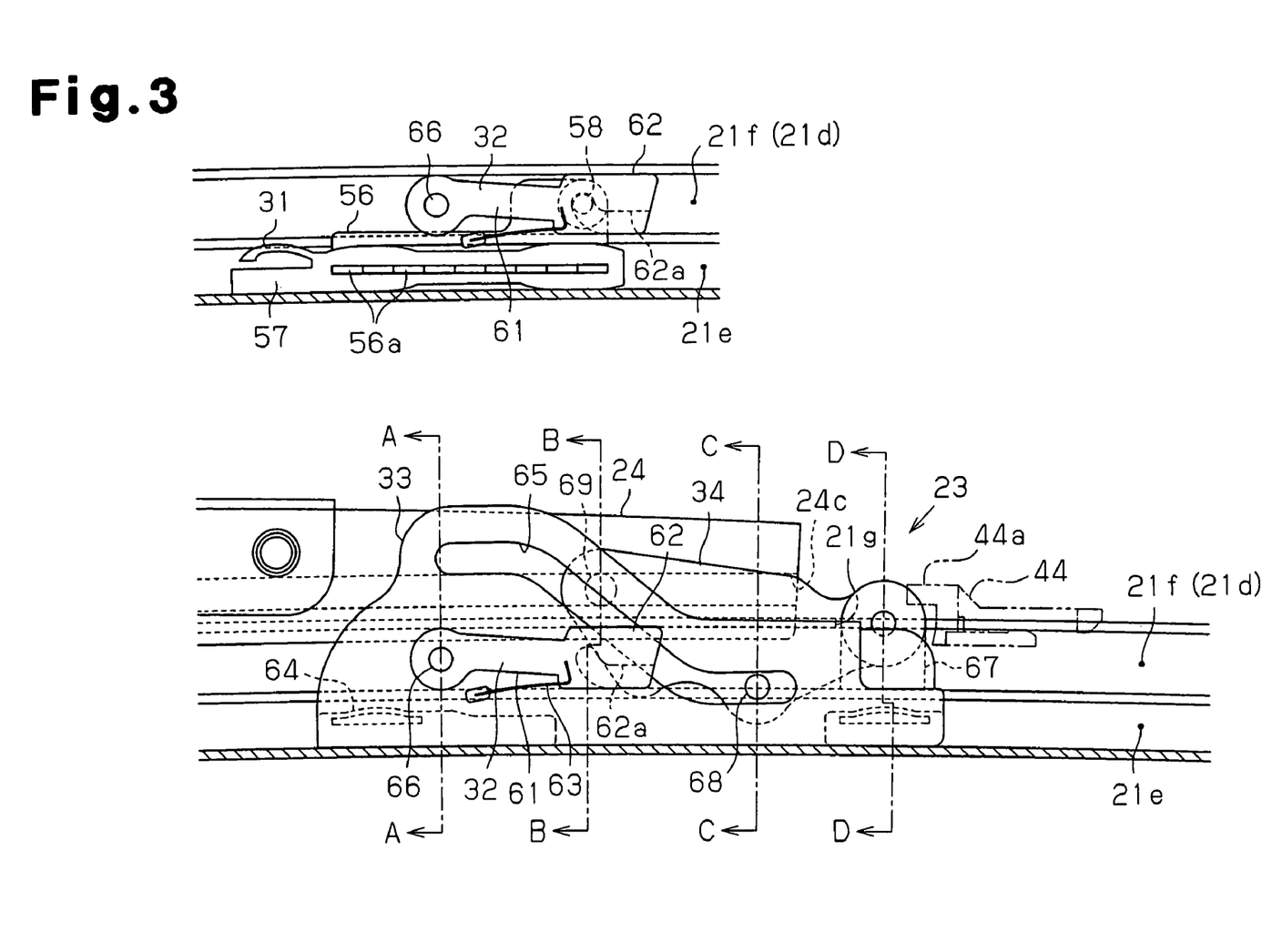
FIG. 3 is an enlarged view showing the rear side of FIG. 1(a)

FIG. 2 enlargedly shows the front side of FIG. 1(*a*), and FIG. 3 enlargedly shows the rear side of FIG. 1(*a*). As shown in FIGS. 2 and 3, the front mechanism section 22 includes a front shoe 26 and a front check block 27, and the rear mechanism section 23 includes a rear shoe 31, a rear check block 32, an elevation guide 33, and an elevation link 34. FIG. 1(*a*) and FIG. 3 show the rear shoe 31 dividedly for convenience so that the rear shoe 31 of the rear mechanism section 23 shown in superposed relation with other members is exposed in the side view.

Figure 4A:
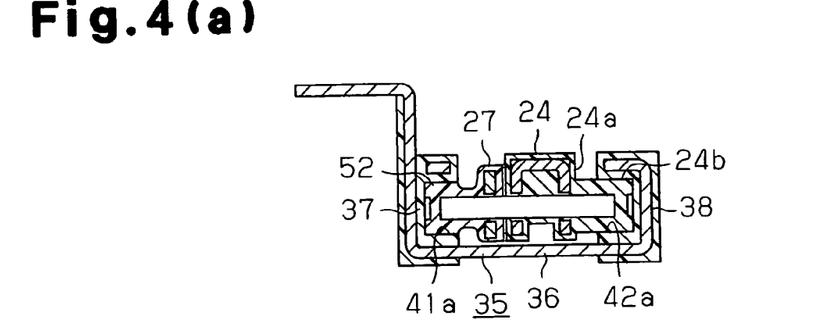
FIG. 4(a) is a cross-sectional view taken along the line A-A of FIG. 2.
Figure 4B:
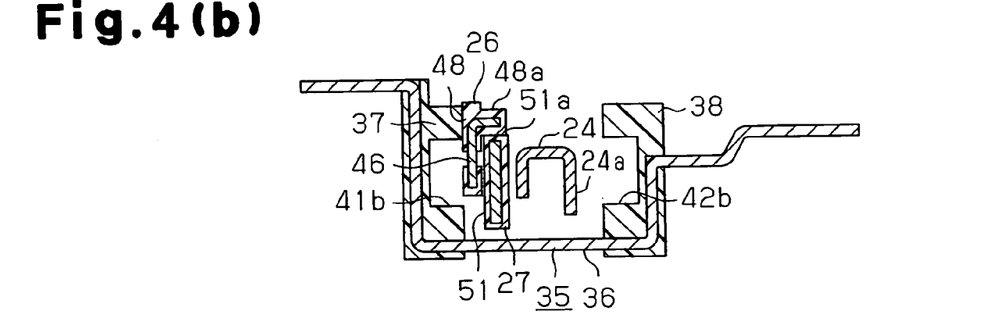
FIG. 4(b) is a cross-sectional view taken along the line B-B of FIG. 2.
Figure 4D:
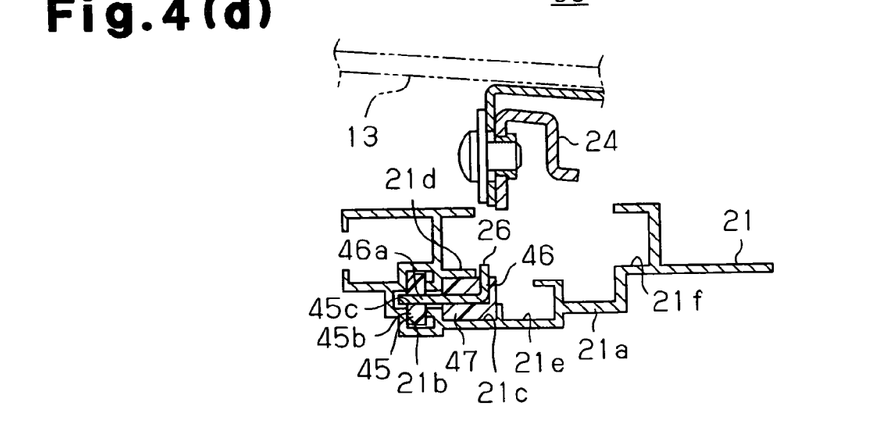
FIG. 4(d) is a cross-sectional view taken along the line D-D of FIG. 2.
Figure 5A:
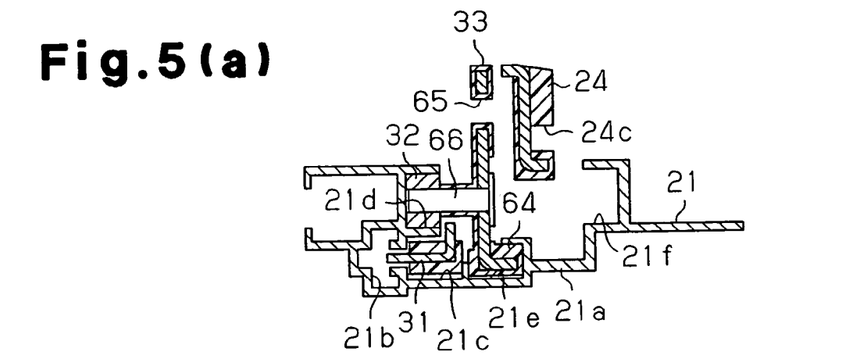
FIG. 5(a) is a cross-sectional view taken along the line A-A of FIG. 3.

The guide rail 21 accommodates the front mechanism section 22 and the rear mechanism section 23 so that the front mechanism section 22 and the rear mechanism section 23 can perform a desired operation. Specifically, as shown in FIG. 4(*a*) to 5(*d*), the guide rail 21 has almost the same transversely cross-sectional shape in the longitudinal direction thereof. For example, as shown in FIG. 4(*d*), the guide rail 21 has a plate portion 21*a*, a belt guide portion 21*b*, and first to fourth guide portions 21*c*, 21*d*, 21*e* and 21*f*. The plate portion 21*a* is arranged in an intermediate portion in the width direction of the guide rail 21. The belt guide portion 21*b* and the first to third guide portions 21*c*, 21*d*, and 21*e* are arranged on one side (the left-hand side of FIG. 4(*d*) corresponding to the inside of vehicle) of the plate portion 21*a*. Further, the belt guide portion 21*b* is arranged on the leftmost side of FIG. 4(*d*) closest to the center axis of vehicle. The first guide portion 21*c* is arranged on the right-hand side of the belt guide portion 21*b* corresponding to the outside of vehicle adjacently to the belt guide portion 21*b*, and the second guide portion 21*d* is arranged on the upper side of the first guide portion 21*c* adjacently to the first guide portion 21*c*. The third guide portion 21*e* is arranged on the right-hand side of the first guide portion 21*c* adjacently to the first guide portion 21*c*. The fourth guide portion 21*f* is arranged on the other side of the plate portion 21*a* (the right-hand side of FIG. 4(*d*) corresponding to the outside of vehicle).

As shown in FIG. 2 and FIGS. 4(*a*) to 4(*c*), in the distal end portion on the front side of the guide rail 21, a guide block 35 constituting the front mechanism section 22 is installed. The guide block 35 has a frame 36, a pair of guide wall portions 37 and 38 formed of a resin material on both sides in the width direction with respect to the frame 36, and a regulation wall portion 39 formed of a resin material on one side (the outside of vehicle) in the width direction with respect to the frame 36. The regulation wall portion 39 is arranged on the rear side of the guide wall portions 37 and 38.

The guide wall portions 37 and 38 are formed with a pair of guide grooves 41 and 42 having the same shape. The guide groove 41 communicates with the opening portion at the distal end of the second guide portion 21*d*, and the guide groove 42 communicates with the opening portion at the distal end of the fourth guide portion 21*f*. The guide grooves 41 and 42 have a pair of first guide groove portions 41*a* and 42*a*, a pair of second guide groove portions 41*b* and 42*b*, and a pair of third guide groove portions 41*c* and 42*c*. The first guide groove portion 41*a*, 42*a* extends to the rear side along the longitudinal direction of the guide rail 21, and the distal end side (front side) thereof is closed. The second guide groove portion 41*b* extends slantwise upward and to the rear side while communicating with the first guide groove portion 41*a*, and the second guide groove portion 42*b* extends slantwise upward and to the rear side while communicating with the first guide groove portion 42*a*. The third guide groove portion 41*c* extends to the rear side along the longitudinal direction of the guide rail 21 while communicating with the second guide groove portion 41*b*, and communicates with the opening portion at the distal end of the second guide portion 21*d*. The third guide groove portion 42*c* extends to the rear side along the longitudinal direction of the guide rail 21 while communicating with the second guide groove portion 42*b*, and communicates with the opening portion at the distal end of the fourth guide portion 21*f*.

The regulation wall portion 39 is formed with a regulation groove 43 (constituting a regulation section) communicating with the opening portion at the distal end of the third guide portion 21*e*. The regulation groove 43 has a regulation groove portion 43*a* and a guide groove portion 43*b*. The regulation groove portion 43*a* extends upward so as to intersect substantially at right angles to the longitudinal direction of the guide rail 21, and the distal end side thereof is closed. The guide groove portion 43*b* extends in an arcuate shape so as to communicate with the regulation groove portion 43*a*, and communicates with the opening portion at the distal end of the third guide portion 21*e*.

As shown in FIG. 3 and FIG. 5(*d*), in the vicinity of the elevation link 34 in an upper wall portion in the wall portion of the guide rail 21 forming the second guide portion 21*d*, a notch 21*g* is formed. On the rear side of the notch 21*g*, a stopper 44 constituting the rear mechanism section 23 is mounted. The stopper 44 has a regulation element 44*a*, and the regulation element 44*a* projects to the notch 21*g* side on the upper side of the upper wall portion forming the second guide portion 21*d*.

As shown in FIG. 4(*d*) and FIG. 5(*b*), in the belt guide portion 21*b*, a driving belt 45 engagedly connected to an output pulley of a drive motor, not shown, is inserted. In FIGS. 4(*a*) to 4(*c*) and FIGS. 5(*a*), 5(*c*) and 5(*d*), the illustration of the driving belt 45 is omitted for convenience.

The driving belt 45 is formed of a resin material, and has a plurality of teeth 45*b*. Also, the driving belt 45 is formed with a plurality of (five in this embodiment) mount holes 45*c* for connecting the front shoe 26 and the rear shoe 31 at mounting positions thereof. These mount holes 45*c* are arranged at predetermined intervals in the longitudinal direction of the driving belt 45. The driving belt 45 can be moved in the longitudinal direction of the belt guide portion 21*b*, and the mount hole 45*c* is open corresponding to the contracted opening portion on the first guide portion 21*c* side in the belt guide portion 21*b*.

The front shoe 26 is supported slidably on the first guide portion 21*c* of the guide rail 21. As shown in FIG. 2, the front shoe 26 includes a frame 46 forming the skeleton thereof, and a guide shoe 47 and an extension portion 48, which are formed of a resin material on the frame 46. The guide shoe 47 is arranged on the rear side of the front shoe 26, and the extension portion 48 is arranged on the front side of the front shoe 26.

As shown in FIG. 4(*d*), the front shoe 26 is supported in such a manner that the guide shoe 47 is mounted in the first guide portion 21*c*. The frame 46 is formed with a plurality of (five in this embodiment) mounting elements 46*a* provided projectingly so as to correspond to the mount holes 45*c*, and each of the mounting elements 46*a* passes through the guide shoe 47 and is fitted in the mount hole 45*c* in the driving belt 45. The front shoe 26 is connected to the driving belt 45 by fitting the mounting elements 46*a* in the mount holes 45*c*. Therefore, the front shoe 26 moves on the first guide portion 21c in association with the movement of the driving belt 45 along the longitudinal direction of the belt guide portion 21b.

Figure 10A:
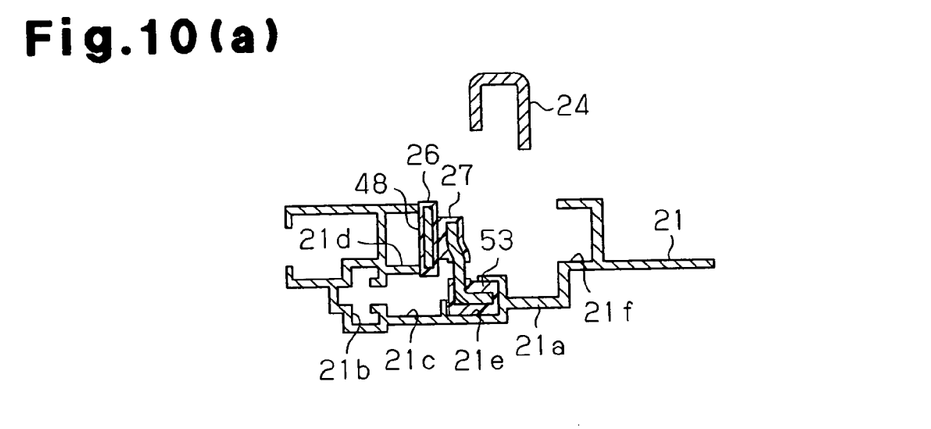
FIG. 10(a) is a cross-sectional view taken along the line A-A of FIG. 9.
Figure 10B:
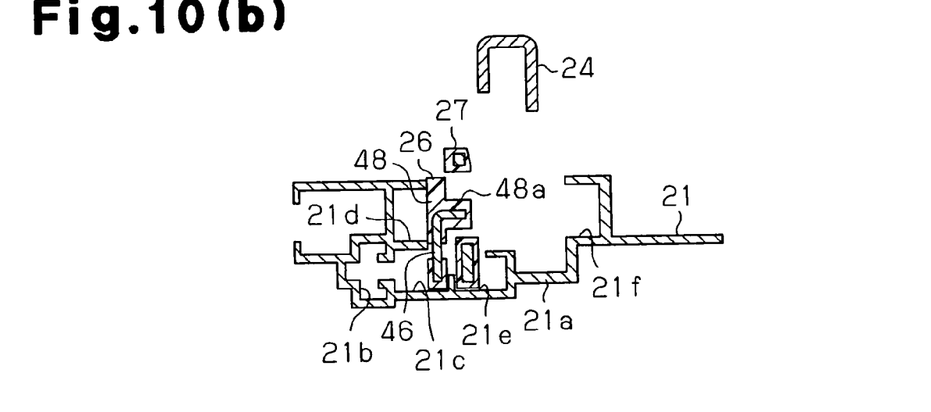
FIG. 10(b) is a cross-sectional view taken along the line B-B of FIG. 9.

As shown in FIG. 10(b), the extension portion 48 is provided in the upper end portion of the frame 46 extending upward from an opening portion formed on the third guide portion 21e on the prolonged line in the longitudinal direction of the first guide portion 21c. In the upper end portion on the front side of the extension portion 48, an engagement pin 48a (constituting a first engagement portion) projecting in the width direction is provided. The engagement pin 48a is located at a height equivalent to the opposed opening portion on the prolonged line in the longitudinal direction of the second guide portion 21d and the fourth guide portion 21f, and is provided projectingly on the fourth guide portion 21f side.

As shown in FIG. 2, the front check block 27 is arranged adjacently to the front shoe 26 between an arm portion 24a extending from the distal end portion on the front side of the functional bracket 24 and the front shoe 26. The front check block 27 includes a lever portion 51 formed of a resin material on the frame forming the skeleton thereof, a guide pin 52, and a regulation pin 53 (constituting a second engagement portion). At the distal end on the rear side of the lever portion 51, an engagement groove 54 (constituting a third engagement portion) having a hook-shaped inner wall surface that extends from a lower part to the upside and is folded to the front side is provided. The inner wall surface of the engagement groove 54 extends at least upward from the engagement pin 48a. On the lower end surface of the lever portion 51, a deflection portion 55 (constituting a holding portion) is provided.

As shown in FIG. 4(a), the guide pin 52 is provided projectingly in a columnar shape on the guide wall portion 37 side in the distal end portion on the front side of the lever portion 51. The functional bracket 24 has a columnar guide pin 24b (constituting an engagement portion of the functional bracket 24), and the guide pin 24b is provided projectingly on the guide wall portion 38 side in the distal end portion of the arm portion 24a. The front check block 27 is supported rotatably on the arm portion 24a, and the turning axis of the front check block 27 coincides with a center axis common to the guide pins 52 and 24b. Therefore, in the closed state, the functional bracket 24 and the front check block 27 are supported integrally on the guide block 35 by inserting the guide pin 52 in the guide groove 41 and inserting the guide pin 24b in the guide groove 42. At this time, the guide pin 52 is arranged in the first guide groove portion 41a, which is the horizontal section of the guide groove 41, and the guide pin 24b is arranged in the first guide groove portion 42a, which is the horizontal section of the guide groove 42.

On the distal end surfaces and the outer peripheral surfaces of these guide pins 52 and 24b, deflection structures in elastic contact with the inner wall surfaces of the guide grooves 41 and 42 are provided integrally, the deflection structures each being formed of a resin material. Thereby, looseness of the functional bracket 24 and the front check block 27 in the closed state is restrained. Also, the deflection portion 55 comes into elastic contact with the frame 36 of the guide block 35 in the closed state, so that by being urged by the deflection portion 55, looseness of the functional bracket 24 and the front check block 27 in the guide block 35 is also restrained.

Figure 4C:
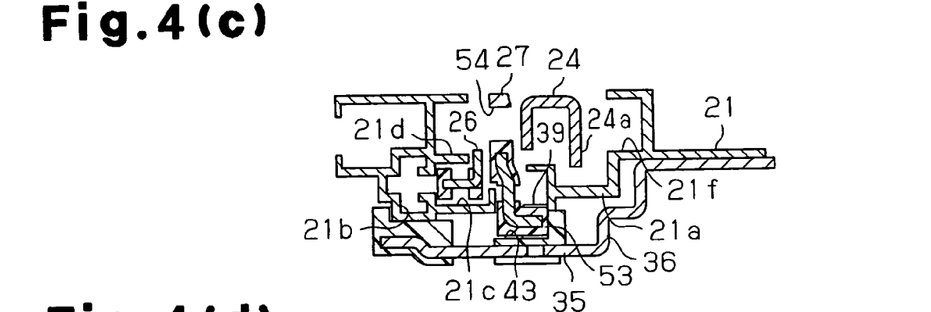
FIG. 4(c) is a cross-sectional view taken along the line C-C of FIG. 2.

Also, as shown in FIG. 4(c), the regulation pin 53 is provided projectingly on the regulation wall portion 39 side in the distal end portion on the rear side of the lever portion 51. Therefore, in the closed state, the front check block 27 is also supported on the guide block 35 by the regulation pin 53 inserted in the regulation groove 43.

In the closed state shown in FIG. 2 and FIGS. 4(a) to 4(d), an upper end surface 51a of the lever portion 51 is pressedly stopped by the engagement pin 48a of the front shoe 26, so that the front check block 27 cannot be moved upward. Therefore, even if the front shoe 26 moves to the rear side, during the time when the upper end surface 51a of the lever portion 51 is pressedly stopped by the engagement pin 48a, the regulation pin 53 is inserted in the regulation groove 43 and is in a locked state, so that the front check block 27 cannot be moved in the upward direction and the front and rear direction together with the functional bracket 24. However, the functional bracket 24 is allowed to rotate with the center axis of the guide pin 24b and the guide pin 52 being the rotation axis.

Figure 6:
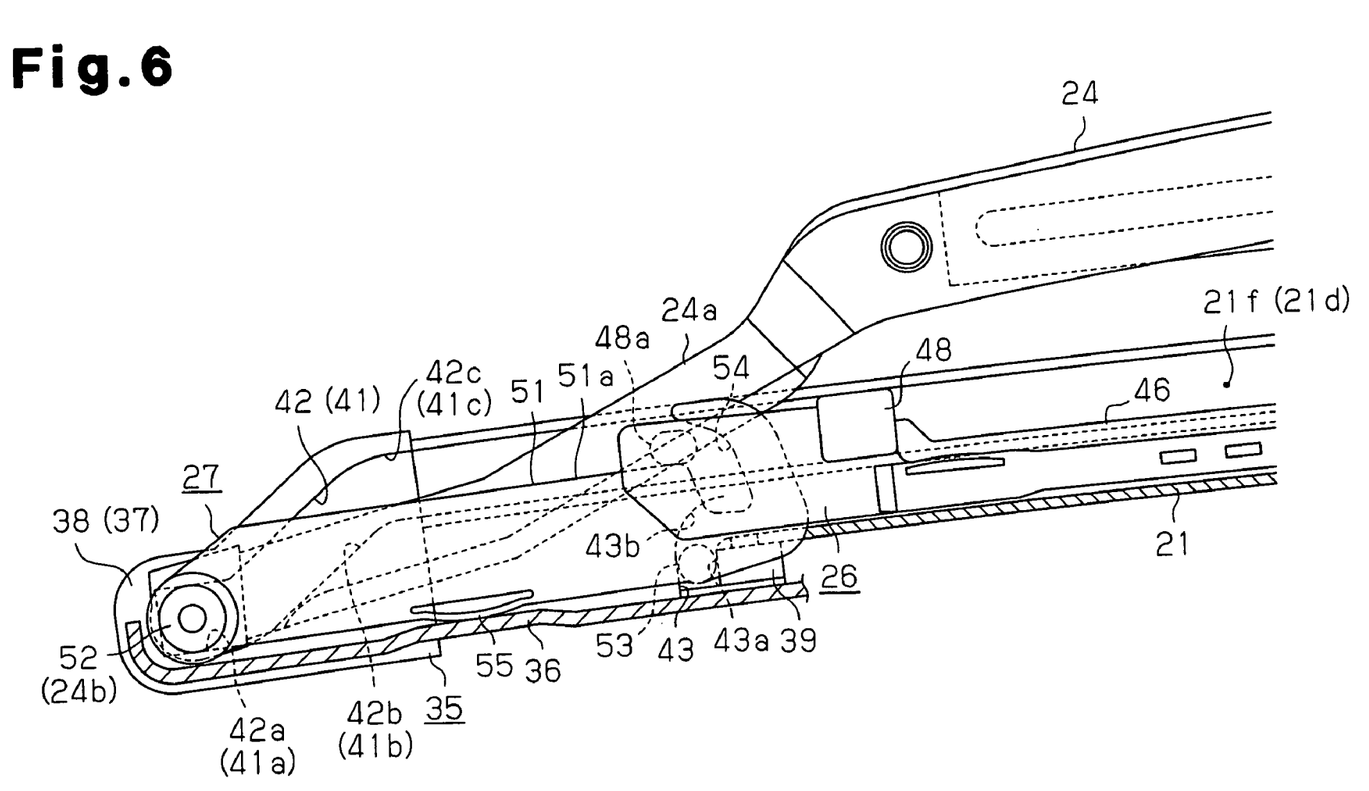
FIG. 6 is an enlarged view showing the front side of FIG. 1(b)

Also, as shown in FIG. 6 in which the front side of FIG. 1(b) is enlargedly shown, in the tilt-up state, the engagement pin 48a arrives at the rear end of the upper end surface 51a of the lever portion 51 due to the movement of the front shoe 26 to the rear side. Therefore, when the front shoe 26 moves to the rear side from this state, the engagement pin 48a is arranged above a concave portion extending downward, which is formed by the inner wall surface of the engagement groove 54, and the regulation of upward movement of the front check block 27 is relaxed (unlocked state).

Figure 7:
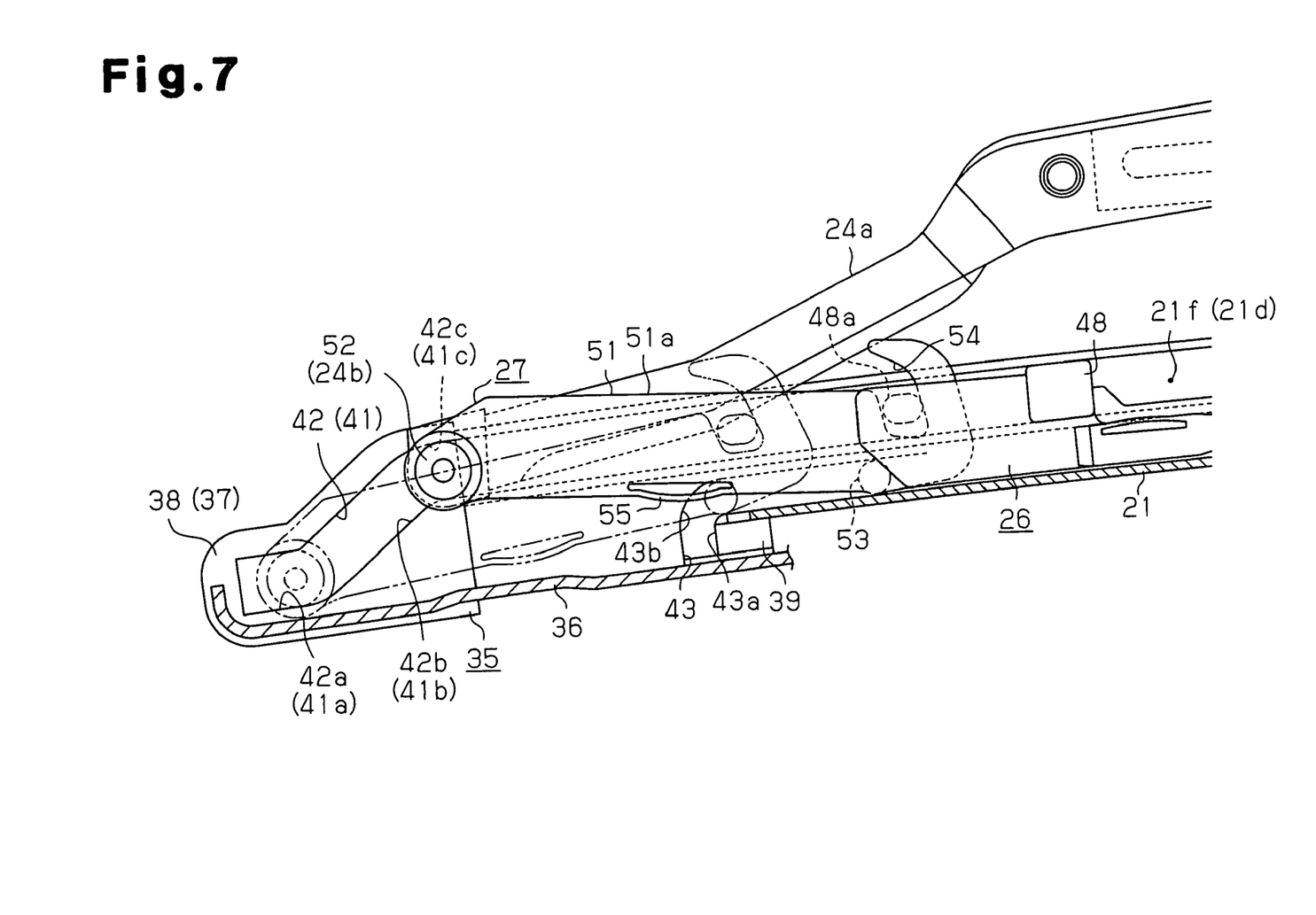
FIG. 7 is an enlarged view showing the front side of FIG. 1(c)

Then, as shown in FIG. 7 in which the front side of FIG. 1(c) is enlargedly shown, when the front shoe 26 is further moved to the rear side from the unlocked state, the inner wall surface of the engagement groove 54 is pressed to the rear side by the engagement pin 48a. Therefore, the front check block 27 moves the regulation pin 53 upward along the regulation groove 43 while moving the guide pin 52 to the rear side along the first guide groove portion 41a of the guide groove 41, and hence pushes up the engagement groove 54 in the upward direction. At this time, as shown in FIG. 7 and FIG. 10(a), the regulation pin 53 having moved upward is guided to the third guide portion 21e with which the regulation groove 43 communicates and is mounted therein.

When the front shoe 26 is further moved to the rear side from this state, the front check block 27 moves the guide pin 52 slantwise upward along the second guide groove portion 41b of the guide groove 41 while moving the regulation pin 53 to the rear side along the third guide portion 21e. At the same time, the front check block 27 moves the guide pin 24b of the functional bracket 24 connected thereto slantwise upward along the second guide groove portion 42b of the guide groove 42, and hence pushes up the arm portion 24a in the upward direction. At this time, the guide pin 52 having moved upward is guided to the second guide portion 21d with which the guide groove 41 communicates via the third guide groove portion 41c and is mounted therein. At the same time, the guide pin 24b of the functional bracket 24 is guided to the fourth guide portion 21f with which the guide groove 42 communicates via the third guide groove portion 42c and is mounted therein.

As the front shoe 26 is further moved to the rear side, the guide pin 52 is guided to the second guide portion 21d, and also the regulation pin 53 is guided to the third guide portion 21e. Further, in a state in which the guide pin 24b is guided to the fourth guide portion 21f, the front check block 27 and the functional bracket 24 move (slide) to the rear side integrally. That is, when the state transfers to the fully opened state after the arm portion 24a has been pushed up in the upward direction, the front part of the functional bracket 24 is supported on the fourth guide portion 21f in which the guide pin 24b is mounted.

In this connection, even when the guide pin 52 of the front check block 27 moves along the second guide portion 21d, and also the guide pin 24b of the functional bracket 24 moves along the fourth guide portion 21f, the deflection structure provided on the guide pin 52 comes into elastic contact with the inner wall surface of the second guide portion 21d, and the deflection structure provided on the guide pin 24b comes into elastic contact with the inner wall surface of the fourth guide portion 21f. Thereby, looseness at the time when the functional bracket 24 and the front check block 27 move is also restrained.

When the front shoe 26 having moved to the rear side returns to the front side, needless to say, the operation is performed by reversing the order. Specifically, when the front shoe 26 is moved to the front side from the fully opened state, the inner wall surface on the front side of the engagement groove 54 is pressed by the engagement pin 48a. Then, the guide pin 52 is guided to the second guide portion 21d, and also the regulation pin 53 is guided to the third guide portion 21e. Further, in a state in which the guide pin 24b is guided to the fourth guide portion 21f, the front check block 27 and the functional bracket 24 move (slide) to the front side integrally. The guide pin 52 is guided to the guide groove 41 with which the second guide portion 21d communicates and is mounted therein. At the same time, the guide pin 24b of the functional bracket 24 is guided to the guide groove 42 with which the fourth guide portion 21f communicates and is mounted therein.

Then, when the front shoe 26 is further moved to the front side from this state, the front check block 27 moves the guide pin 52 slantwise downward along the second guide groove portion 41b of the guide groove 41 while moving the regulation pin 53 to the front side along the third guide portion 21e. At the same time, the front check block 27 moves the guide pin 24b of the functional bracket 24 connected thereto slantwise downward along the second guide groove portion 42b of the guide groove 42, and hence pushes down the arm portion 24a in the downward direction. At this time, the regulation pin 53 having moved along the third guide portion 21e is guided to the regulation groove 43 with which the third guide portion 21e communicates and is mounted therein.

When the front shoe 26 is further moved to the front side from this state, the regulation pin 53 is lowered along the regulation groove 43, and at the same time, the upper end surface 51a of the lever portion 51 is pressedly stopped by the engagement pin 48a having removed from the engagement groove 54, by which the front check block 27 is made immovable. Then, the front shoe 26 is further moved to the front side while the front check block 27 is immovable, returning to the closed state.

The reason why the front part and the rear part of the functional bracket 24 are raised before the sliding operation thereof or the front part and the rear part of the functional bracket 24 are lowered after the sliding operation thereof is that the roof opening portion 10a is closed to keep the sealing ability in the passenger compartment by bringing the movable panel 13 mounted to the functional bracket 24 into elastic contact with a sealing member, not shown, provided in the roof opening portion 10a from the upside.

As is apparent from the above explanation, the front check block 27 has a function as a link for moving the front part of the functional bracket 24 in the vertical direction and in the front and rear direction in addition to a function as a checking member for regulating the movement of the front part of the functional bracket 24. The reason why the front check block 27 having such functions is provided extendingly on the rear side of the guide pin 24b, which is the rotation center of the functional bracket 24, is that the restraint of sliding amount of the functional bracket 24 imposed by the arrangement of such a functional member on the front side of the guide pin 24b is avoided.

The rear shoe 31 is, like the front shoe 26, supported slidably on the first guide portion 21c of the guide rail 21. As shown in FIG. 3, the rear shoe 31 includes a frame 56 forming the skeleton thereof, a guide shoe 57 formed of a resin material on the frame 56, and an engagement pin 58 arranged on the rear side of the rear shoe 31.

Figure 5B:
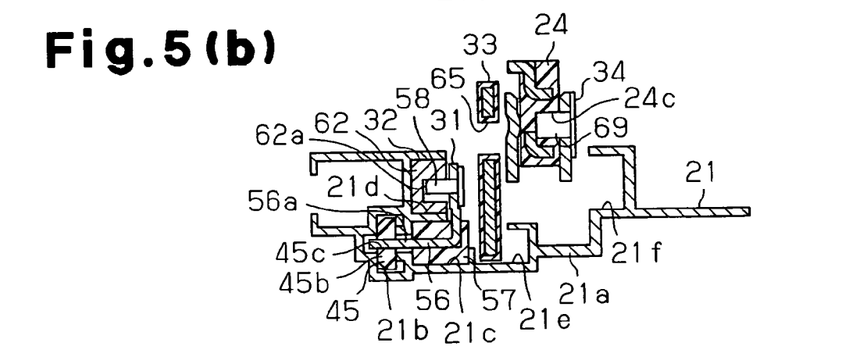
FIG. 5(b) is a cross-sectional view taken along the line B-B of FIG. 3.
Figure 5C:
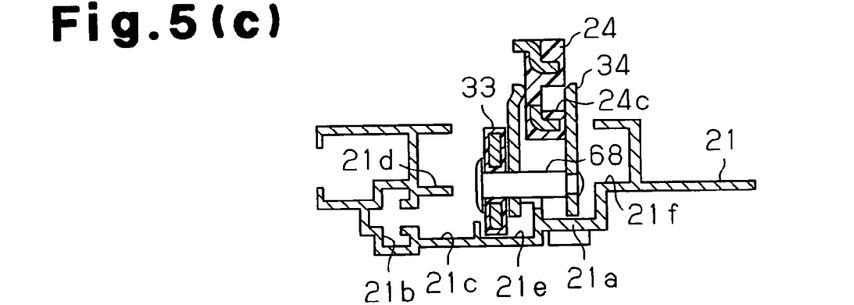
FIG. 5(c) is a cross-sectional view taken along the line C-C of FIG. 3.
Figure 5D:
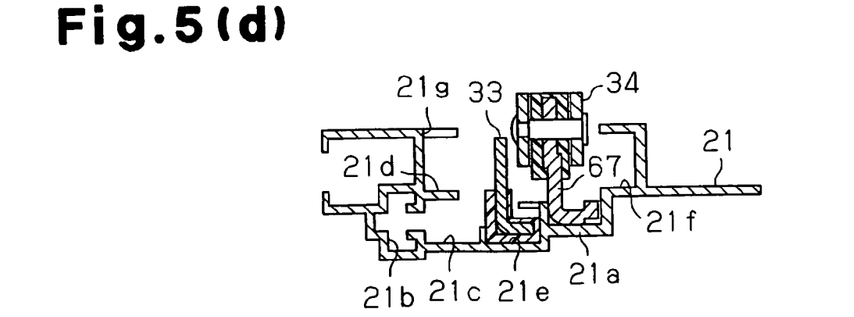
FIG. 5(d) is a cross-sectional view taken along the line D-D of FIG. 3.

As shown in FIG. 5(b), the rear shoe 31 is supported in a state in which the guide shoe 57 is mounted in the first guide portion 21c, and a plurality of (five in this embodiment) mounting elements 56a provided projectingly so as to correspond to the mount holes 45c are formed in the frame 56. Each of the mounting elements 56a passes through the guide shoe 57 and is fitted in the mount hole 45c in the driving belt 45. The rear shoe 31 is connected to the driving belt 45 by fitting the mounting elements 56a in the mount holes 45c. Therefore, the rear shoe 31, like the front shoe 26, moves on the first guide portion 21c in association with the movement of the driving belt 45 along the longitudinal direction of the belt guide portion 21b.

The engagement pin 58 is provided in the upper end portion on the rear side of the frame 56 extending upward from the opening portion formed on the third guide portion 21e side of the first guide portion 21c. This engagement pin 58 is located at a height equivalent to the opposed opening portion of the second guide portion 21d and the fourth guide portion 21f, and is provided projectingly on the second guide portion 21d side.

As shown in FIG. 3, the rear check block 32 includes a lever portion 61 supported pivotally on the elevation guide 33, and an engagement portion 62 formed at the distal end of the lever portion 61. The lever portion 61 extends to the rear side along the second guide portion 21d, and the rear check block 32 is supported on the second guide portion 21d in a state in which the engagement portion 62 is mounted in the second guide portion 21d. This rear check block 32 is urged to the upper wall portion side in the wall portion forming the second guide portion 21d.

The engagement portion 62 is formed with an engagement groove 62a which is bent upward after extending from the distal end lower part on the rear side to the front side. With this engagement groove 62a, the engagement pin 58 of the rear shoe 31 is engaged. Therefore, when the rear shoe 31 moves in the front and rear direction, the rear check block 32 moves on the second guide portion 21d integrally with the rear shoe 31 together with the elevation guide 33.

Figure 8:
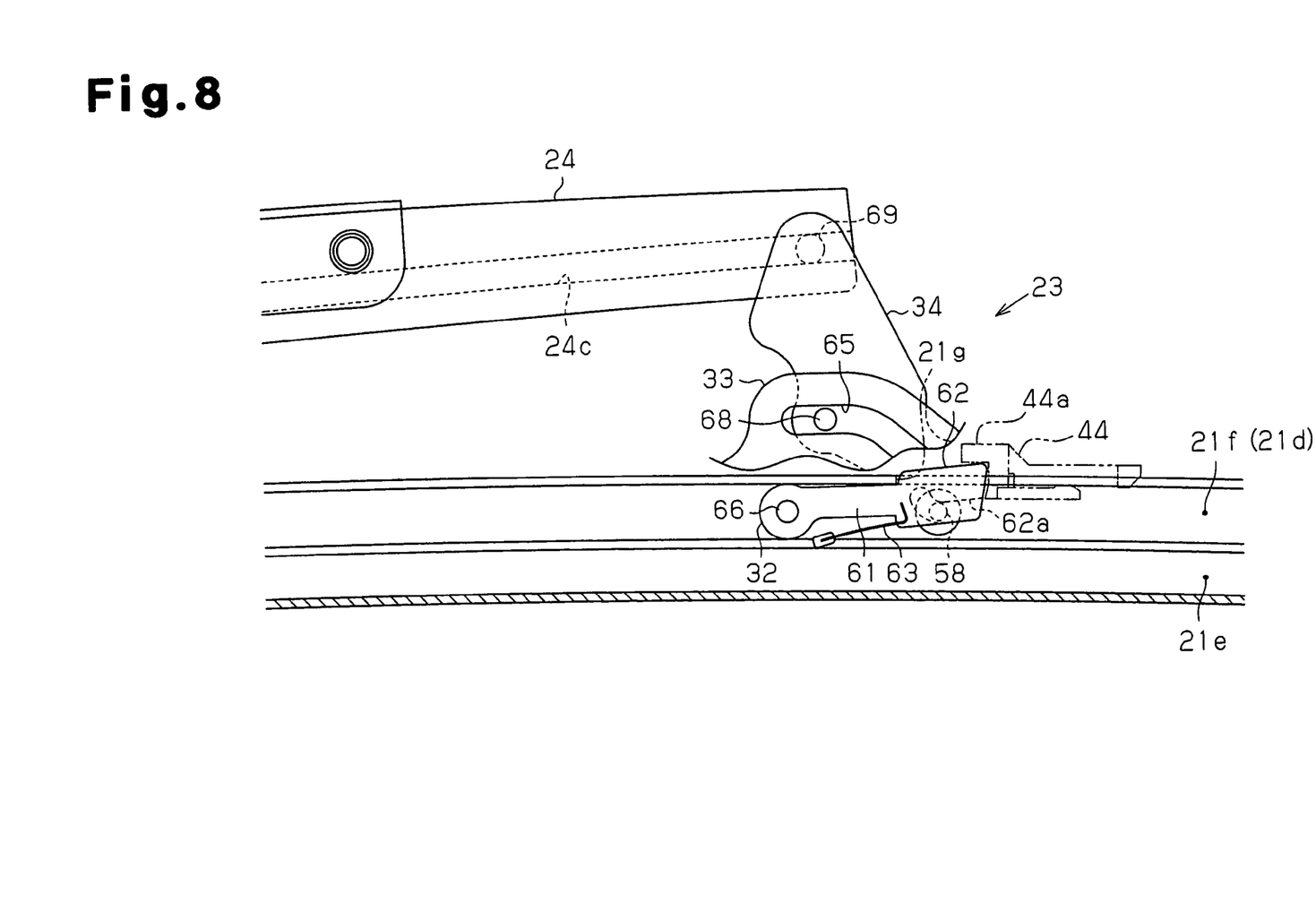
FIG. 8 is an enlarged view showing the rear side of FIG. 1(b)

Also, as shown in FIG. 8 in which the rear side of FIG. 1(b) is enlargedly shown, in the tilt-up state, as the rear shoe 31 moves to the rear side, the engagement portion 62 of the rear check block 32 arrives at the notch 21g formed in the second guide portion 21d. Then, by the urging force of an urging member 63, the rear check block 32 is turned upward until the engagement portion 62 fits in the notch 21g and is regulated by the regulation element 44a of the stopper 44. At this time, the engagement groove 62a is arranged so that the rear side is opened with respect to the engagement pin 58 of the rear shoe 31, and the engagement pin 58 is disengaged from the engagement groove 62a. The engagement groove 62a is formed so that the lower side is opened with respect to the engagement pin 58, so that when the rear check block 32 turns upward, the engagement groove 62a and the engagement pin 58 do not interfere with each other. Then, the rear shoe 31 is disconnected from the rear check block 32 so as to be movable to the rear side singly, and the rear check block 32 stops at that position together with the elevation guide 33.

The elevation guide 33 is arranged adjacently to the rear shoe 31 and the rear check block 32, and includes a guide shoe 64, a guide hole 65, and a shaft portion 66 provided projectingly on the rear check block 32 side to pivotally support the rear check block 32. As shown in FIG. 5(a), this elevation guide 33 is supported on the third guide portion 21e in a state in which the guide shoe 64 is mounted in the third guide portion 21e. When the engagement pin 58 of the rear shoe 31 and the engagement groove 62a in the rear check block 32 are in an engaged state, the elevation guide 33 moves on the third guide portion 21e via the rear check block 32 in association with the movement in the front and rear direction of the rear shoe 31.

The guide hole 65 extends slantwise downward from the front side toward the rear. The elevation guide 33 is engaged with the elevation link 34 in this guide hole 65, so that the elevation link 34 is moved up and down in association with the movement in the front and rear direction of the elevation guide 33.

That is, as shown in FIG. 3 and FIG. 5(d), the elevation link 34 is supported pivotally on a bracket 67 fixed to the plate portion 21a of the guide rail 21 in the vicinity of the notch 21g, and is provided with a guide pin 68, which is inserted in the guide hole 65, on the front side of the turning center of the elevation link 34. This guide pin 68 is arranged on the distal end side of a lower part of the guide hole 65, which is on the rear side of the guide hole 65, in the closed state. Therefore, when the elevation guide 33 is moved to the rear side in this state, the elevation guide 33 moves the guide pin 68 upward along the guide hole 65, and turns the distal end of the elevation link 34 in the clockwise direction in the figure so as to push it up in the upward direction. As shown in FIG. 8, in the tilt-up state, the guide pin 68 having moved upward along the guide hole 65 is arranged at the distal end on the front side, which is at the uppermost position of the guide hole 65.

In the distal end portion of the elevation link 34, an engagement pin 69 is provided to support the functional bracket 24. Specifically, in the outside surface of the functional bracket 24, a guide groove 24c extending in the longitudinal direction is formed, and the rear part of the functional bracket 24 is supported on the engagement pin 69 by inserting the engagement pin 69 of the elevation link 34 in the guide groove 24c. Therefore, the rear part of the functional bracket 24 is moved upward integrally with the elevation link 34 by turning the elevation link 34 so that the elevation link 34 is pushed up in the upward direction, by which the tilt-up operation is performed. When the rear shoe 31 having moved to the rear side returns to the front side, needless to say, the operation is performed by reversing the order.

Also, in the state in which the elevation link 34 is turned so as to be pushed up in the upward direction, the guide groove 24c in which the engagement pin 69 is inserted is open in the longitudinal direction, which is the travel direction (slide direction) of the functional bracket 24. Therefore, when the front part of the functional bracket 24 is moved to the rear side integrally with the front shoe 26 via the front check block 27 along with the movement of the front shoe 26 to the rear side, the functional bracket 24 moves (slides) to the rear side in such a manner as to be guided along the guide groove 24c by the engagement pin 69.

Figure 9:
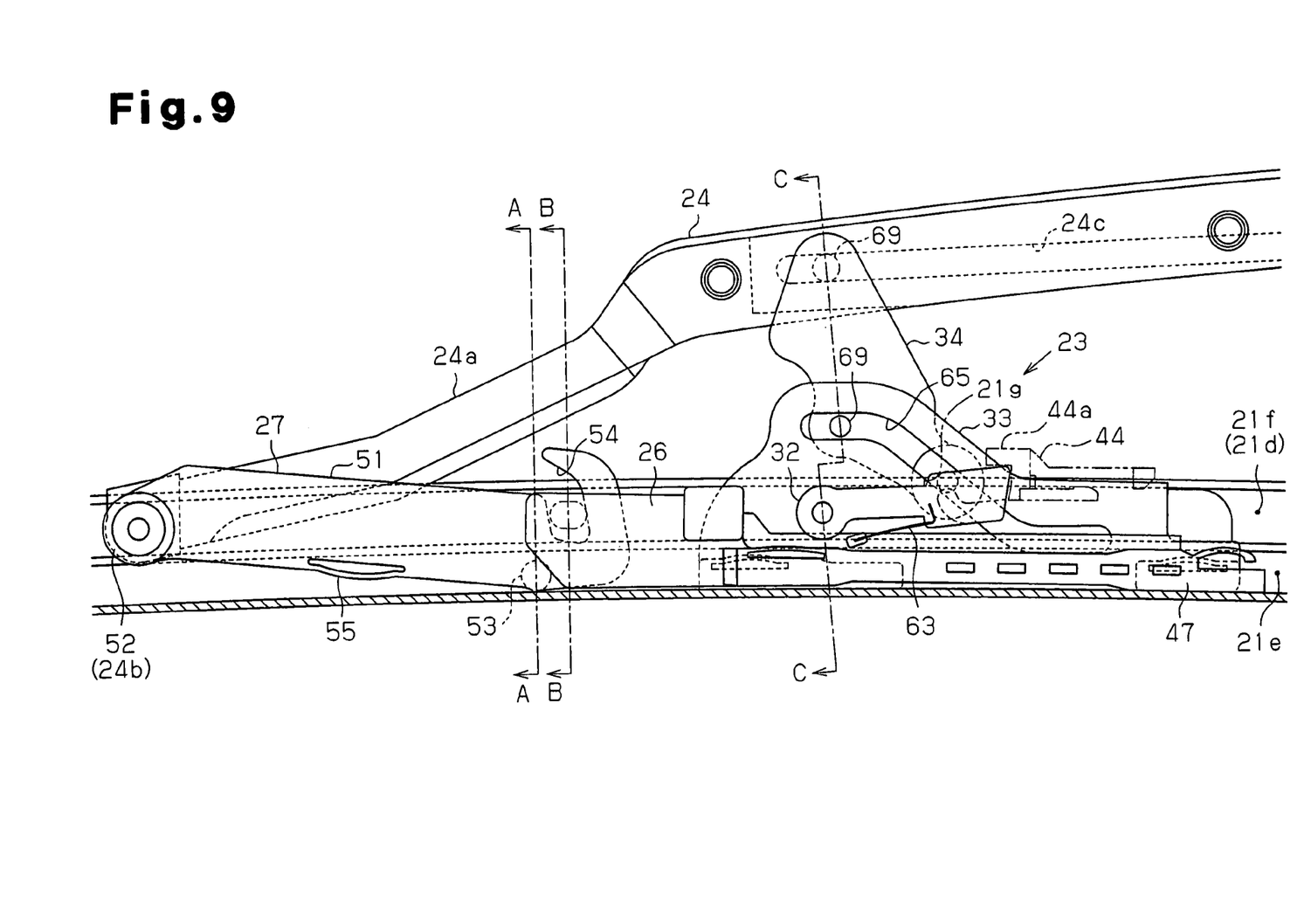
FIG. 9 is an enlarged view showing the rear side of FIG. 1(c)
Figure 10C:
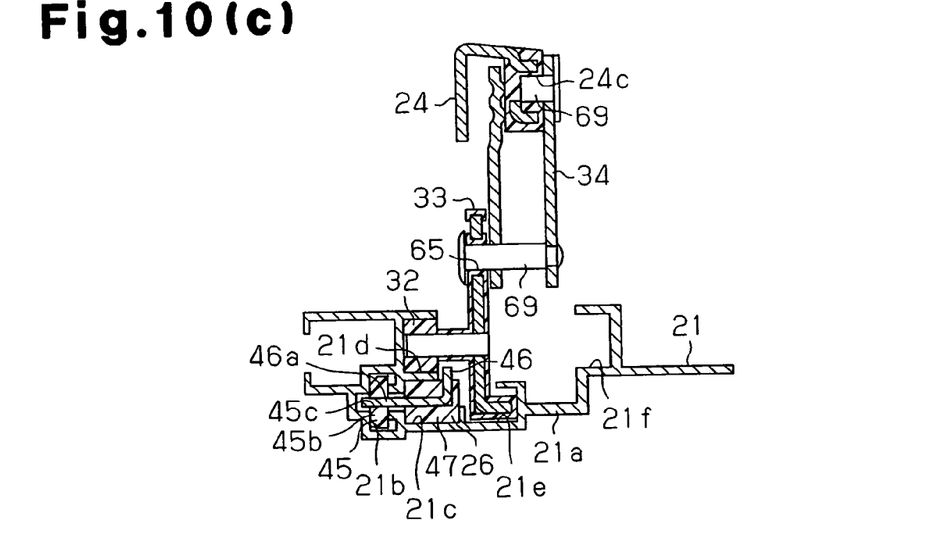
FIG. 10(c) is a cross-sectional view taken along the line C-C of FIG. 9.

As shown in FIG. 9 in which the rear side of FIG. 1(c) is enlargedly shown, in the opened state (fully opened state) in which the movement (sliding) has been finished, the functional bracket 24 moves to the rear side to a predetermined position at which the engagement pin 69 is arranged at the distal end on the front side of the guide groove 24c. At this time, the front check block 27 that uses the guide shoe 64 of the elevation guide 33 and the third guide portion 21e in common is arranged on the front side in the vicinity of the elevation guide 33. Therefore, when the state transfers to the fully opened state, the front check block 27 and the elevation guide 33 do not interfere with each other. Also, at this time, as shown in FIG. 9 and FIG. 10(c), the guide shoe 47 of the front shoe 26 arrives at the position of the rear shoe 31 in the closed state. In this state, however, the rear shoe 31 further moves to the rear side, so that it is a matter of course that the guide shoe 47 and the rear shoe 31 do not interfere with each other.

When the front shoe 26 returns to the front side from this state, needless to say, the operation is performed by reversing the order.

Next, the operation of the mechanism section 20 of the sunroof device 11 having the above-described configuration is explained generally. When the driving belt 45 is driven and moved to the rear side in the state in which the movable panel 13 is closed, the front shoe 26 and the rear shoe 31, which are connected to the driving belt 45, are integrally moved to the rear side. Along with the movement of the rear shoe 31 to the rear side, the rear check block 32 in a state of being engaged by the engagement pin 58 is moved to the rear side integrally with the rear shoe 31 together with the elevation guide 33 connected to the rear check block 32. Then, as the elevation guide 33 moves to the rear side, the guide pin 68 of the elevation link 34, which is inserted through the guide hole 65, is pushed up in the upward direction along the guide hole 65, and thereby the elevation link 34 is turned in the clockwise direction in the figure so that the distal end side thereof is raised.

When the rear check block 32 arrives at the notch 21g along with the movement of the rear shoe 31 to the rear side, by the urging force of an urging member 63, the rear check block 32 is turned upward until the engagement portion 62 fits in the notch 21g and is regulated by the regulation element 44a of the stopper 44, by which the tilt-up operation of the movable panel 13, in which the rear part of the functional bracket 24 is moved upward, is finished. Until the tilt-up operation is finished, the front shoe 26 is merely moved to the rear side in a state in which the upper end surface 51a of the lever portion 51 is pressedly stopped by the engagement pin 48a, and the front check block 27 and the front part of the functional bracket 24 connected thereto do not move. In other words, until the rise in the rear part of the functional bracket 24 is finished and the transfer to the tilt-up state is finished, the operation of only the rear part of the functional bracket 24 is allowed, and the front part thereof is stopped, by which the tilt-up operation is stabilized, and the increase in load occurring at the time of simultaneous operation is restrained.

By the finish of tilt-up operation, the connection between the rear shoe 31 and the rear check block 32 due to the engagement pin 58 is broken, and in the following operation, as described above, the rear shoe 31 merely moves to the rear side on the first guide portion 21c.

When the driving belt 45 is driven and further moved to the rear side in the tilt-up state, the front shoe 26 and the rear shoe 31 are also moved further to the rear side integrally. At this time, the regulation of upward movement of the front check block 27 and the functional bracket 24 due to the engagement pin 48a of the front shoe 26 is relaxed. Then, the inner wall surface of the engagement groove 54 is pressed by the engagement pin 48a, so that the front check block 27 moves the regulation pin 53 upward along the regulation groove 43 while moving the guide pin 52 to the rear side along the first guide groove portion 41a of the guide groove 41, and hence pushes up the engagement groove 54 in the upward direction. At this time, the regulation pin 53 having moved upward is guided to the third guide portion 21e with which the regulation groove 43 communicates and is mounted therein.

Then, when the front shoe 26 is further moved to the rear side from this state, the front check block 27 moves the guide pin 52 slantwise upward along the second guide groove portion 41b of the guide groove 41 while moving the regulation pin 53 along the third guide portion 21e, and pushes up the arm portion 24a of the functional bracket 24 connected thereto in the upward direction. At this time, the guide pin 52 having moved upward is guided to the second guide portion 21d with which the guide groove 41 communicates via the third guide groove portion 41c and is mounted therein. At the same time, the guide pin 24b of the functional bracket 24 is guided to the fourth guide portion 21f with which the guide groove 42 communicates via the third guide groove portion 42c and is mounted therein. Then, as the front shoe 26 further moves to the rear side, the front check block 27 moves to the rear side in a state in which the guide pin 52 is guided to the second guide portion 21d and the regulation pin 53 is guided to the third guide portion 21e. Then, the functional bracket 24 moves to the rear side until forming the fully opened state integrally with the front check block 27 in a state in which in the front part, the guide pin 24b is guided to the fourth guide portion 21f and, in the rear part, the guide groove 24c is guided to the engagement pin 69.

When the driving belt 45 is driven reversely and moved to the front side in a state in which the movable panel 13 is fully opened, needless to say, the state is returned to the tilt-up state and to the closed state by performing the operation by reversing the order. At this time, until the movable panel 13 transfers to the tilt-up state, the operation of only the front side of the functional bracket 24 is allowed, and the rear part thereof is stopped, by which the closing operation of the movable panel 13 is stabilized, and the increase in load occurring at the time of simultaneous operation is restrained.

As described in detail above, according to this embodiment, the advantages described below can be obtained.

(1) In this embodiment, in the state in which the rise in rear part of the functional bracket 24 is unfinished, the movement of the front check block 27 caused by the movement of the front shoe 26 is inhibited because the regulation pin 53 is pressedly stopped by the engagement pin 48a so as to be locked to the regulation groove 43. Thereby, the functional bracket 24 supported on the front check block 27 is inhibited from moving in the state in which the rise in rear part is unfinished.

On the other hand, in the state in which the rise in rear part of the functional bracket 24 is finished, the engagement groove 54 is engaged with the engagement pin 48a, the regulation pin 53 is guided to the regulation groove 43 along with the movement of the front shoe 26, and the locking state of the regulation pin 53 and the regulation groove 43 is released, by which the front check block 27 is moved integrally with the front shoe 26. Thereby, the functional bracket 24 supported on the front check block 27 is also moved (slid) integrally in the front and rear direction of the vehicle. Thus, along with the movement of the front shoe 26, the regulation pin 53 locked to the regulation groove 43 is guided to the regulation groove 43 to release the locking state, by which a changeover from the state in which the movement of the functional bracket 24 is inhibited to the state in which it is allowed is accomplished. Alternatively, along with the movement of the front shoe 26, the regulation pin 53 unlocked from the regulation groove 43 is guided in the direction opposite to the regulation groove 43 to form the locking state, by which a changeover from the state in which the movement of the functional bracket 24 is allowed to the state in which it is inhibited is accomplished.

Therefore, an unusual sound (flipping sound) at the time of changeover can be restrained as compared with the case where such a changeover is accomplished suddenly, for example, by utilizing the elastic force of an urging member (a spring etc.).

(2) In this embodiment, the front check block 27 is provided extendingly on the rear side of the turning center of the functional bracket 24. Therefore, the restraint of travel amount of the functional bracket 24 can be avoided, for example, unlike the case where the check block is arranged on the front side of the turning center of the functional bracket 24. Thereby, even in the case where the functional bracket 24 is slid to the rear side to fully open the movable panel 13, a sufficient tilt-up amount can be obtained while the distance between the support positions in the front part and the rear part, namely, the holding span is secured. Therefore, troubles can be avoided such that the strength becomes insufficient because of an insufficient holding span or that the ventilation is deteriorated or an unusual sound due to air flow is produced because of an insufficient tilt-up amount.

(3) In this embodiment, because of the deflection portion 55 of the front check block 27 and the deflection structures of the distal end surface and the outer peripheral surface of the guide pins 52 and 24b, looseness of the front part of the functional bracket 24 in the state in which the rise in rear part thereof is unfinished can be restrained without the addition of separate parts.

(4) In this embodiment, the front part of the functional bracket 24 can be raised or lowered along with the front check block 27, so that, for example, the degree of freedom can be improved in designing the seal structure between the movable panel 13 supported on the functional bracket 24 and the roof opening portion 10a. Also, the guide pin 24b has a center axis coinciding with the turning center of the functional bracket 24 and is guided to the guide groove 42. Therefore, the turning center of the functional bracket 24 rises or lowers directly along the guide groove 42, so that a loss of driving force can be reduced as compared with, for example, the case where another member is interposed to raise or lower the turning center of the functional bracket 24.

Furthermore, the front check block 27 is provided with the function as a link for moving the front part of the functional bracket 24 in the vertical direction in addition to the function of inhibiting the movement of the functional bracket 24. Thereby, the number of parts can be reduced as compared with, for example, the case where members having these functions are provided individually. Therefore, the cross-sectional area of the guide rail 21 is reduced, and hence the space occupied by the guide rail 21 can be saved. Since the cross-sectional area of the guide rail 21 is reduced, the opening area of the roof opening portion can be increased accordingly. Also, since the number of parts is reduced, the cost can also be reduced accordingly.

(5) The configuration is such that one end of the front check block 27 is connected directly to the functional bracket 24 and pivotally supports the functional bracket 24, and the position of the other end of the front check block 27 is regulated by the regulation groove 43 of the guide block 35 integral with the guide rail 21. Therefore, the position in the front and rear direction of the functional bracket 24 with respect to the guide rail 21 can be regulated exactly. Also, the guide pin 24b fixed to the distal end of the functional bracket 24 is supported on the guide groove 42 formed on the guide block 35 integral with the guide rail 21. Therefore, the position in the vertical direction of the functional bracket 24 is also regulated exactly. Thus, the configuration is such that the exact position of the movable panel 13 fixedly supported on the functional bracket 24 can be secured with respect to the roof opening portion 10a especially in the fully opened state.

(6) The regulation pin 53 provided in the rear-side end portion of the front check block 27 and the engagement groove 54 are arranged vertically and also arranged at almost the same position in the front and rear direction. Thereby, the engagement and disengagement of the regulation pin 53 with and from the regulation groove 43 are controlled by a great displacement of the front check block 27 turned by the engagement of the engagement pin 48a with the engagement groove 54. Therefore, exact timing of engagement and disengagement can be secured, and a trouble such as catching occurring at the time of engagement and disengagement can be avoided.

The above-described embodiment may be modified as described below.

- In the above-described embodiment, the shapes of the regulation pin 53 and the regulation groove 43 may be changed to appropriate shapes having the same function.
- In the above-described embodiment, the configuration relating to the operation control of the front part of the functional bracket 24 using the front shoe 26 is one example, and other configurations may be employed. For example, a configuration in which the predetermined member is divided into two parts and the function as that member is given to the two parts does not depart from the present invention.
- In the above-described embodiment, the present invention is not limited to the sunroof device in which the movable panel 13 and the front part of the functional bracket 24 are raised and lowered. The sunroof device may be such that the movable panel 13 and the front part of the functional bracket 24 are merely slid.
- In the above-described embodiment, the sunroof device 11 provided with one slidable movable panel 13 has been explained. However, the sunroof device may be provided with a plurality of movable panels each having the same construction and function.

The invention claimed is:

1. A sunroof device comprising:
   a functional bracket which supports a movable panel provided in a roof opening portion of a vehicle;
   a regulation section provided on a guide rail;
   a shoe which has a first engagement portion and moves in the front and rear direction of the vehicle along the guide rail; and
   a check block having a second engagement portion and a third engagement portion,
   wherein the configuration is such that the functional bracket is connectingly supported pivotally on the check block, and the functional bracket and the check block are raised or lowered integrally; the check block is pressedly stopped by the first engagement portion so that the second engagement portion is locked to the regulation section in a state in which rise in a rear part of the functional bracket is unfinished thereby inhibiting the check block from moving along with the movement of the shoe; and the third engagement portion is locked to the first engagement portion in a state in which the rise in the rear part of the functional bracket is finished to release the locking state of the second engagement portion and the regulation section along with the movement of the shoe, by which the shoe and the check block are moved integrally.

2. The sunroof device according to claim 1, wherein the check block is extendingly provided on the rear side of a turning center of the functional bracket.

3. The sunroof device according to claim 2, wherein the second engagement portion and the third engagement portion are arranged vertically, and are provided in a rear-side end portion of the check block.

4. The sunroof device according to claim 1, wherein the regulation section is a regulation groove formed so that the second engagement portion can be guided to a guide block fixed to the guide rail.

5. The sunroof device according to claim 1, wherein the check block has a holding portion for restraining looseness of a front part of the functional bracket in the state in which the rise in the rear part of the functional bracket is unfinished.

6. The sunroof device according to claim 1, further comprising a guide groove provided in the guide rail,
   wherein the functional bracket has an engagement portion having a center axis coinciding with a turning center of the check block and being guided into the guide groove to move the front part of the functional bracket up and down during the integral movement of the check block and the shoe.

7. The sunroof device according to claim 6, wherein an outer wall surface of the engagement portion has a deflection structure which comes into elastic contact with the inner wall surface of the guide groove in a state in which the rise in the rear part of the functional bracket is unfinished.

\* \* \* \* \*